Nov. 16, 1965 R. A. POTRUCH 3,218,385
CABLE BRACE
Filed Oct. 30, 1963
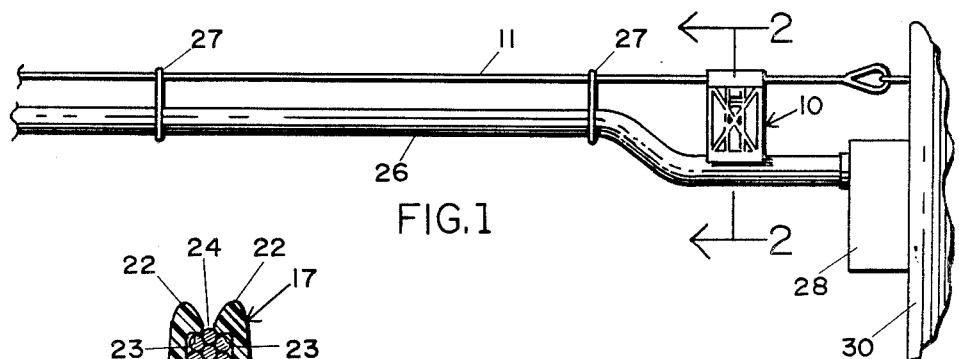
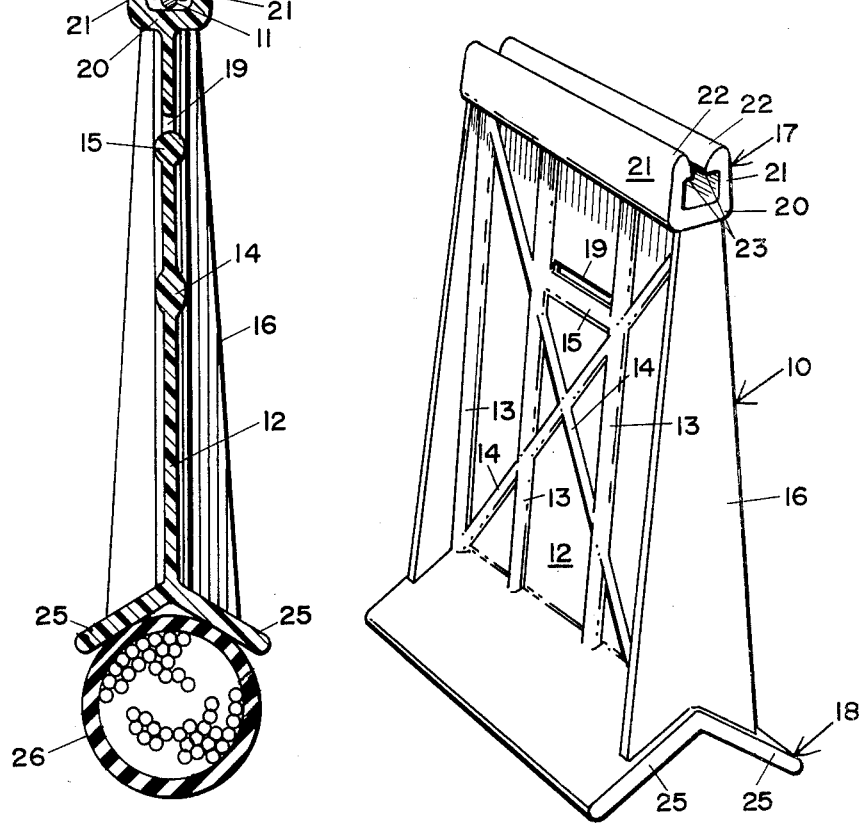
INVENTOR.
ROBERT A. POTRUCH
BY
Salvatore G. Militana
attorney

3,218,385
CABLE BRACE
Robert A. Potruch, Miami Beach, Fla., assignor to Lumidor Products Corporation, Hialeah, Fla., a corporation of Maryland
Filed Oct. 30, 1963, Ser. No. 320,200
2 Claims. (Cl. 174—40)

This invention relates to supporting devices and is particularly directed to a cable brace.

A principal object of the present invention is to provide a cable brace for a telephone cable and the like that is molded of a sturdy yet pliable plastic material and eliminates the need for lashings or other fastening members.

Another object of the present invention is to provide a brace for telephone cables and the like that is readily mounted on a support strand without the use of tools and straps thereby resulting in the saving of time, money and labor.

A further object of the present invention is to provide a cable brace for telephone cables that permits slack to be fashioned in the cable for entry into a terminal where the wires are spliced with ease because of the extra length available to the telephone lines.

A still further object of the present invention is to provide a cable brace that can be readily mounted and dismantled from a telephone cable and can be reused when removed from one cable to another.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

FIGURE 1 is a side elevational view of my cable brace shown positioned on a support strand and engaging a cable in proximity of a terminal to illustrate its function.

FIGURE 2 is a cross sectional view taken along the line 2—2 of FIGURE 1.

FIGURE 3 is an enlarged perspective view of my cable brace.

Referring to the drawing wherein like numerals are used to designate similar parts throughout the several views, the numeral 10 refers to a cable brace constructed in accordance with my invention of a plastic composition consisting of polypropylene with butyl, which results in a tough and sturdy member yet sufficiently pliable to permit fastening the device to a support strand 11 as is explained in detail hereinafter. The cable brace 10 consists of a flat body member 12 reinforced by a plurality of protuberant and longitudinally disposed members 13 and similarly disposed diagonal members 14. There is a cross member 15 embossed on both sides of the flat body member 12 extending between a pair of longitudinal members 13 for reinforcement of the body member 12 at the position of a slot 19 which extends between the pair of the longitudinal members 13.

At the extreme edges of the flat body member 12 there extends a side wall member 16, which is positioned at right angle to the flat body member 12 and extends on each side of the flat body member 12. The side wall member 16 extends from a resilient clip member 17 to a cable engaging member 18. The resilient clip 17 has a U-shaped cross section consisting of a base member 20 which is integral with the top edge of the flat body member 12. Leg portions 21 extend upwardly of the base member 20 terminating in an enlarged and rounded lip portion 22 positioned in open spaced relation to each other to form an opening 24. At the inner edge of the lip portion 22 is a shoulder 23 which extends along the full length of the clip member 17. The leg portions 21 are somewhat resilient permitting the lip portions 22 to move in a direction away from each other enlarging the opening 24 to permit the support strand 11 to slide therebetween and engage the shoulders 23 and become secured therein as best shown by FIGURE 2. On the lower end of the flat body member is the cable engaging member 18 which consists of a pair of flat members 25 positioned at an oblique angle with each other to form a V with its apex integrally joined to the lower end of the flat body member 12. The side walls 16 which extend from the strand clip 17 to the cable engaging member 18 are of increasing width.

Cable braces such as applicant's cable brace 10 are used to provide slack to a cable 26 which extends from one supporting member 30 to another (not shown). The support strand 11 which extends above and in parallel relation to the cable 26 has its ends secured to the same support members with a plurality of hanger straps 27 extending over the support strand 11 and around the cable 26 at appropriate intervals for supporting the cable 26. At a position spaced from the terminal 28 the cable 26 is bent away from the support strand 11 to allow the slack as aforesaid. The cable brace 10 is mounted on the cable 26 with the members 25 engaging the cable 26 and the support strand 11 is placed at the opening 24 of the resilient clip 17 and forced downwardly to become engaged by the shoulders 23. The cable 26 will be held securely in spaced relation to the support strand 11 by the cable brace 10. Also if desired, the cable brace 10 may be secured to the cable 26 by a strap (not shown) that may extend through the slot 19 and about the cable 26.

What I claim as new and desire to secure by Letters Patent of the United States is:

1. A cable brace comprising a substantially rectangular body portion having a top portion and a bottom portion, a resilient clip base member mounted along said top portion, a pair of leg portions extending from said base member in substantially parallel and spaced relation terminating in an arcuate lip portion and forming a slotted portion extending substantially the length of said body portion, shoulder means mounted on an inner portion of said leg portions for engaging a support strand, a pair of cable engaging members joined along inner edge portions and extending at an obtuse angle with each other, said cable engaging members secured at said inner edge portions to the other end of said substantially rectangular flat body portion and wall members secured to side edges of said substantially rectangular flat body portion and extending between said base member of said clip means and said cable engaging members.

2. A cable brace consisting of a substantially rectangular flat body portion, a plurality of longitudinally and diagonally disposed reinforcement members mounted thereon, resilient clip means mounted at one end of said substantially rectangular flat body portion, said resilient clip means comprising a base member secured to said one end of said substantially rectangular flat body portion, a pair of leg portions extending from said base member in substantially parallel and spaced relation terminating in an arcuate lip portion, shoulder means mounted on an inner portion of said leg portions for engaging a support strand, a pair of cable engaging members joined along inner edge portions and extending at an obtuse angle with each other, said cable engaging members secured at said inner edge portions to the other end of said substantially rectangular flat body portion and wall members secured to side edges of said substantially rectangular flat body portion and extending between said base member of said clip means and said cable engaging members.

References Cited by the Examiner
FOREIGN PATENTS 259,962 4/1927 Great Britain.
515,024 11/1939 Great Britain.

JOHN F. BURNS, *Primary Examiner.*
DARREL L. CLAY, *Examiner.*